United States Patent
Muroor

(10) Patent No.: US 7,003,683 B2
(45) Date of Patent: Feb. 21, 2006

(54) GLITCHLESS CLOCK SELECTION CIRCUIT

(75) Inventor: Srikanth R. Muroor, Walnut Creek, CA (US)

(73) Assignee: STMicroelectronics. Inc., Carrollton, TX (US)

( * ) Notice: Subject to any disclaimer, the term of this patent is extended or adjusted under 35 U.S.C. 154(b) by 651 days.

(21) Appl. No.: 10/062,620

(22) Filed: Jan. 31, 2002

(65) Prior Publication Data

US 2003/0145244 A1 Jul. 31, 2003

(51) Int. Cl.
*G06F 1/04* (2006.01)
*H03K 19/00* (2006.01)

(52) U.S. Cl. .................. 713/500; 713/600; 326/93; 327/298

(58) Field of Classification Search ............ 713/600, 713/500; 327/99, 298; 323/96

See application file for complete search history.

(56) References Cited

U.S. PATENT DOCUMENTS

| 5,726,593 | A * | 3/1998 | Ruuskanen | 327/99 |
| 6,275,546 | B1 * | 8/2001 | Miller et al. | 375/354 |
| 6,453,425 | B1 * | 9/2002 | Hede et al. | 713/501 |
| 6,535,048 | B1 * | 3/2003 | Klindworth | 327/407 |
| 6,563,349 | B1 * | 5/2003 | Mavila et al. | 327/99 |
| 6,600,345 | B1 * | 7/2003 | Boutaud | 327/99 |

* cited by examiner

*Primary Examiner*—Chun Cao
(74) *Attorney, Agent, or Firm*—Lisa K. Jorgenson; William A. Munck

(57) ABSTRACT

A clock selection circuit for selecting between two clock sources. The clock selection circuit has two independent clock inputs, CLK1 and CLK2, where no assumptions are made regarding frequency or phase relationship between the two clocks inputs. Two asynchronous inputs, START1 and START2 (both active high), are used to start and stop the clocks. As long as one clock is active, the START signal of the other clock will not have any effect. The invention includes interlock circuitry that ensures that at any given time only one clock is enabled to the output. Disabling the corresponding START signal disables the clock signal.

20 Claims, 2 Drawing Sheets

GLITCHLESS CLOCK SELECTION CIRCUIT

TECHNICAL FIELD OF THE INVENTION

The present invention is generally directed to data processors, radio transceivers, and other circuits that can operate from different clock sources and, more specifically, to a glitchless clock selection circuit for selecting one of two clock sources to apply to a clocked circuit.

BACKGROUND OF THE INVENTION

The speed, power, and complexity of integrated circuits (ICs), such as application specific integrated circuit (ASIC) chips, central processing unit (CPU) chips, digital signal processor (DSP) chips and the like, have greatly increased in recent years. These advancements have made possible the development of system-on-a-chip (SOC) devices, among other things. A SOC device integrates into a single chip all (or nearly all) of the components of a complex electronic system, such as a wireless receiver (i.e., cell phone, a television receiver, and the like). Advanced semiconductor process technologies allow these circuits to be fabricated as dense high performance integrated circuit.

Power dissipation is an important constraint in such dense high performance integrated circuits. A combination of several power minimization techniques is used to keep the power dissipation of chips within bounds. One such technique involves adapting the clock frequency of a circuit to the performance requirement of the system. When higher system throughput is desired, the clock frequency is increased dynamically. The clock frequency is lowered when the throughput requirement is lower to reduce power dissipation of the circuit.

Dynamic control of the system clock frequency may be achieved in two ways, namely:

1) Continuously variable clock frequency: In this technique, the clock frequency of the system can be gradually changed to a new value without stopping the clock. This technique is used in conjunction with voltage scaling techniques and requires analog circuits; and 2) Discretely variable clock frequency: In this technique, the system can operate at only a few predetermined clock frequencies. The transition to a new clock frequency is possible only in discrete steps. To avoid corruption of data stored in the system, the clock to the system must be stopped before the transition from a first clock source to a second clock source is made (i.e., the transition from one clock domain to another must be "glitchless"). An important advantage in using this technique is that the clocks may be switched using digital circuits.

Therefore, there is a need in the art for an improved clock selection circuit for applying a selected one of two clock sources to a clock circuit, such as a data processor.

SUMMARY OF THE INVENTION

This present invention provides a clock selection circuit for selecting between two clock sources. The clock selection circuit has two independent clock inputs, CLK1 and CLK2. No assumption is made about the frequency or phase relationship between the two clocks inputs. Two asynchronous inputs, START1 and START2 (both active high), are used to start and stop the clocks. The global asynchronous reset signal, R (active high), is used at power-on and is essential for correct operation of the circuit. The CLKOUT signal is used as the clock to the system.

After power-on reset, one out of the two clock signals may be switched on using the START1 or START2 signals. As long as one clock is active, the START signal of the other clock will not have any effect. The interlock circuitry ensures that at any given time only one clock is enabled to the output. Disabling the corresponding START signal disables the clock signals.

Important advantages provided by a clock selection circuit according to the principles of the present invention are:

1) Glitchless switching between two clock signals with arbitrary frequency and phase relationship;

2) Interlocked clock switching—The clock selection circuit ensures that the CLKOUT output of one clock has completely stopped before switching to the another.

3) Integral clock period operation—The number of clock pulses is always an integral multiple of the clock period. This eliminates partial (incomplete) clock pulses when switching from one clock source to the other clock source.

To address the above-discussed deficiencies of the prior art, it is a primary object of the present invention to provide, for use with a clocked circuit, a clock selection circuit capable of receiving a first input clock signal and a second input clock signal and outputting to the clocked circuit a selected clock signal derived from one of the first and second input clock signals. According to an advantageous embodiment of the present invention, the clock selection circuit comprises: 1) a first clock control circuit that receives the first input clock signal and a first start signal, wherein the first start signal, when asserted, is capable of causing the first clock control circuit to output a first gated clock signal; 2) a second clock control circuit that receives the second input clock signal and a second start signal, wherein the second start signal, when asserted, is capable of causing the second clock control circuit to output a second gated clock signal; 3) a first interlock circuit that detects when the first clock control circuit begins outputting the first gated clock signal and, in response to the detection, that asserts a first disable signal capable of preventing the second clock control circuit from outputting the second gated clock signal; 4) a second interlock circuit that detects when the second clock control circuit begins outputting the second gated clock signal and, in response to the detection, that asserts a second disable signal capable of preventing the first clock control circuit from outputting the first gated clock signal; and 5) a first OR gate that receives the first and second gate clock signal and outputs the selected clock signal.

The foregoing has outlined rather broadly the features and technical advantages of the present invention so that those skilled in the art may better understand the detailed description of the invention that follows. Additional features and advantages of the invention will be described hereinafter that form the subject of the claims of the invention. Those skilled in the art should appreciate that they may readily use the conception and the specific embodiment disclosed as a basis for modifying or designing other structures for carrying out the same purposes of the present invention. Those skilled in the art should also realize that such equivalent constructions do not depart from the spirit and scope of the invention in its broadest form.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present invention, and the advantages thereof, reference is now made to the following descriptions taken in conjunction with the accompanying drawings, wherein like numbers designate like objects, and in which.

DETAILED DESCRIPTION OF THE INVENTION

FIGS. 1 through 4, discussed below, and the various embodiments used to describe the principles of the present invention in this patent document are by way of illustration only and should not be construed in any way to limit the scope of the invention. Those skilled in the art will understand that the principles of the present invention may be implemented in any suitably arranged data processor or other circuit that uses a clock selection circuit for selecting one of two clock sources to apply to a clocked circuit.

Figure 1:
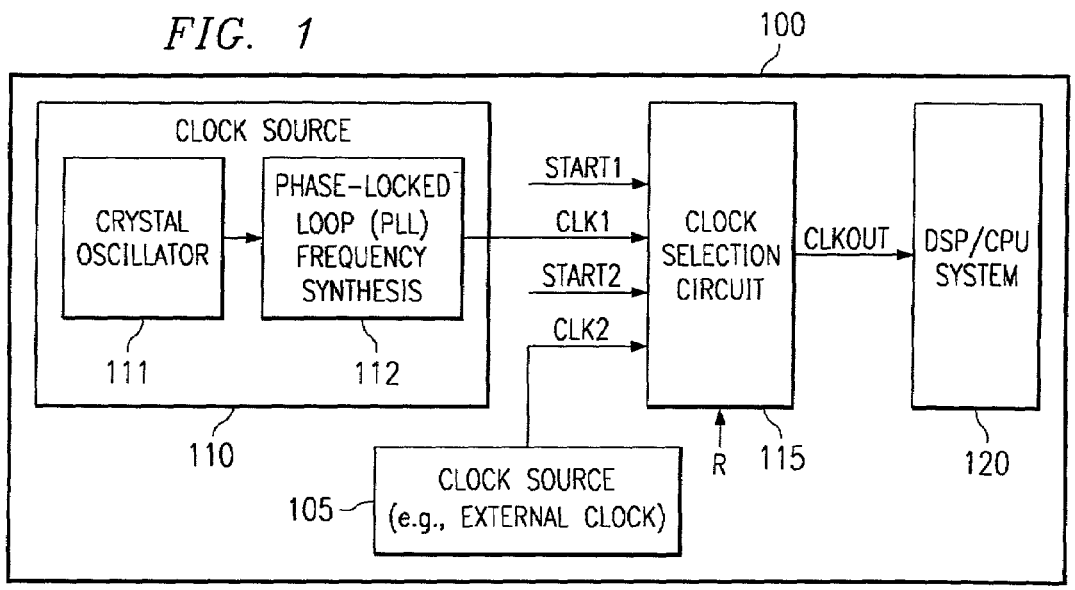
FIG. 1 illustrates a block diagram of a digital processing system according to an exemplary embodiment of the present invention.

FIG. 1 illustrates a block diagram of digital processing system 100 according to one exemplary embodiment of the present invention. Digital processing system 100 comprises clock source 105, clock source 110, clock selection circuit 115, and a digital processing component (i.e., DSP/CPU system 120). Clock source 110 comprises crystal oscillator 111 and phase-locked loop (PLL) frequency synthesizer 112.

Exemplary crystal oscillator 111 generates an output reference frequency signal in which the reference frequency of the output is determined by the mechanical properties of a piezoelectric crystal. Exemplary PLL frequency synthesizer 112 is coupled to the output of crystal oscillator 111 and generates the CLK1 clock signal, which has an operating frequency that is a multiple of the reference frequency provided by crystal oscillator 111. The CLK1 signal may represent a set of clock frequencies. Clock source 105 may be any type of clock signal generator, including an external source, and it generates the CLK2 clock signal.

Generally, speaking DSP/CPU system 120 may be any digital processing component designed for performing mathematical computations and may suitably be programable, meaning that digital processing component 120 may be used for manipulating different types of information, including sound, images, video, and the like. According to the present embodiment, DSP/CPU system 120 has varying operating frequencies and receives a CLKOUT signal from clock selection circuit 115.

Clock selection circuit 115 outputs either the CLK1 clock signal or the CLK2 signal as the CLKOUT signal, depending one the values of the START1 and START2 clock select signals. No assumptions are made about the frequency or phase relationship between the CLK1 clock signal and the CLK2 signal. The CLK1 clock signal and the CLK2 signal may be synchronous or asynchronous. Either of CLK1 and CLK2 signal may be faster, or CLK1 an dCLK2 may operate at the same speed. START1 and START2 are synchronous active high signals that enable the CLK1 clock signal and the CLK2 signal to be connected to the CLKOUT output. The global asynchronous reset signal, R, is an active high signal used at power-on.

Figure 3:
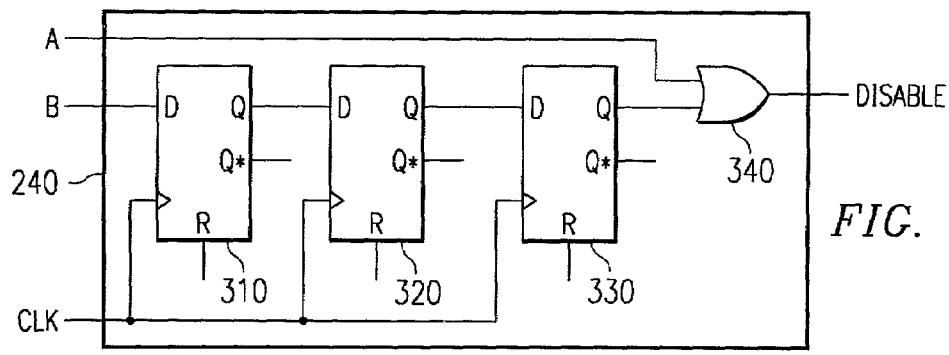
FIG. 3 illustrates in greater detail the interlock circuit in the exemplary clock selection circuit according to one embodiment of the present invention.
Figure 2:
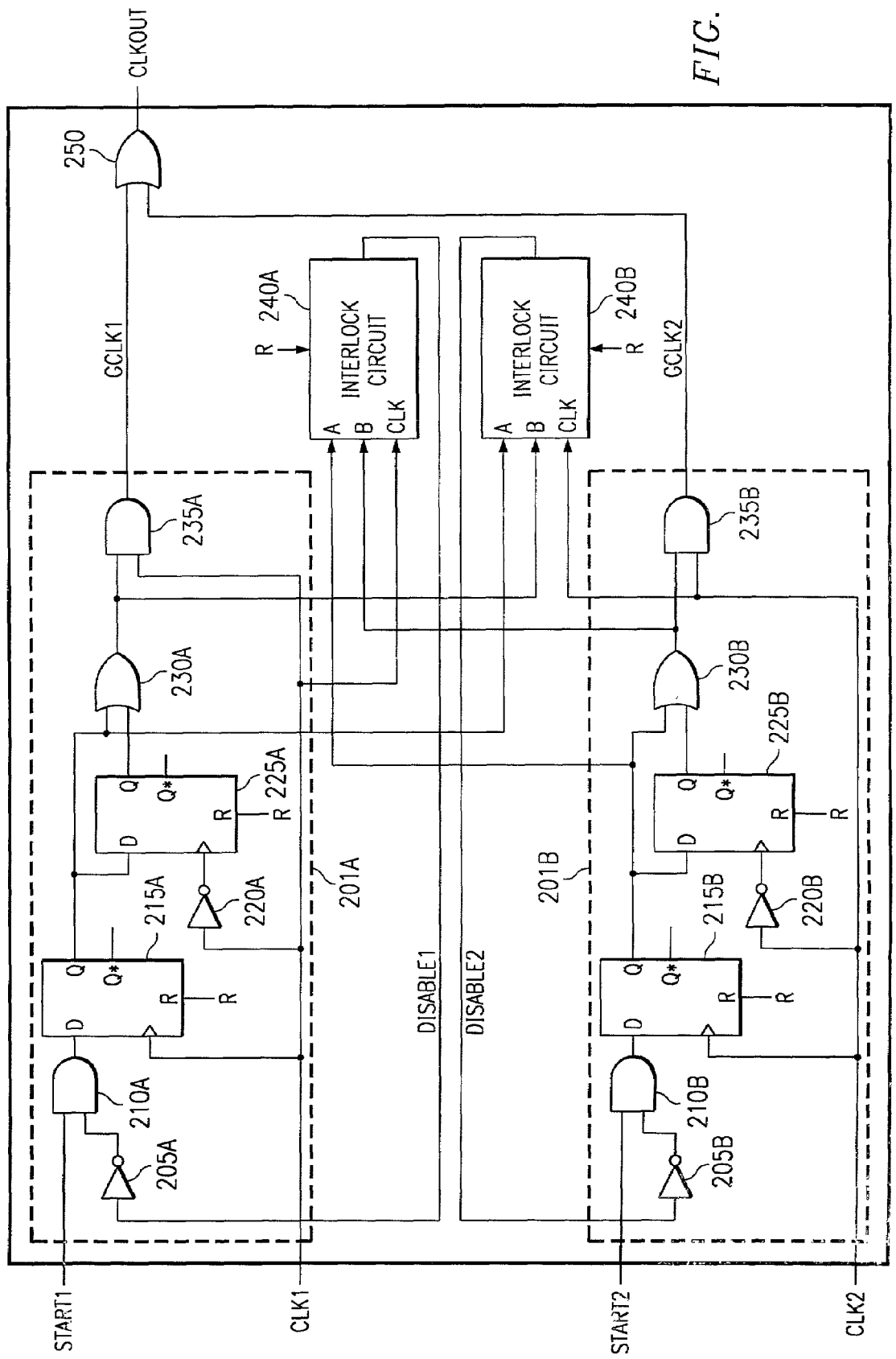
FIG. 2 illustrates the clock selection circuit in FIG. 1 in greater detail according to an exemplary embodiment of the present invention.

FIG. 2 illustrates clock selection circuit 115 in greater detail according to an exemplary embodiment of the present invention. Clock selection circuit 115 comprise clock control circuits 201A and 201B, interlock circuits 240A and 240B, and OR gate 250. Clock control circuits 201A and 201B produce the gated clock output GCLK1 and GCLK2, repsectively. Clock control circuit 201A comprises inverter 205A, AND gate 210A, flip-flop 215A, inverter 220A, flip-flop 225A, OR gate 230A, and AND gate 235A. Clock control circuit 201B comprises inverter 205B, AND gate 210B, flip-flop 215B, inverter 220B, flip-flop 225B, OR gate 230B, and AND gate 235B. FIG. 3 illustrates interlock circuit 240 in clock selection circuit 115 in greater detail according to an exemplary embodiment of the present invention. Interlock circuit 240 in FIG. 3, which is representative of interlock circuits 240A and 240B in FIG. 2, comprises flip-flop 310, flip-flop 320, flip-flop 330, and OR gate 340.

All of flip-flops 215A and 215B, flip-flops 225A and 225B, and flip-flops 310, 320 and 330 are positive (rising) edge-triggered D-type flip-flops (FF). Flip-flop 215A and flip-flops 310, 320, and 330 in interlock circuit 240A are connected directly to the CLK1 clock signal and transfer data on the D input to the Q output when a rising edge occurs on the CLK1 clock signal. Flip-flop 215B and flip-flops 310, 320, and 330 in interlock circuit 240B are connected directly to the CLK2 clock signal and transfer data on the D input to the Q output when a rising edge occurs on the CLK2 clock signal. Flip-flop 225A is connected to the CLK1 clock signal through inverter 220A and transfers data on the D input to the Q output when a falling edge occurs on the CLK1 clock signal. Flip-flop 225B is connected to the CLK2 clock signal through inverter 220B and transfers data on the D input to the Q output when a falling edge occurs on the CLK2 clock signal.

Figure 4:
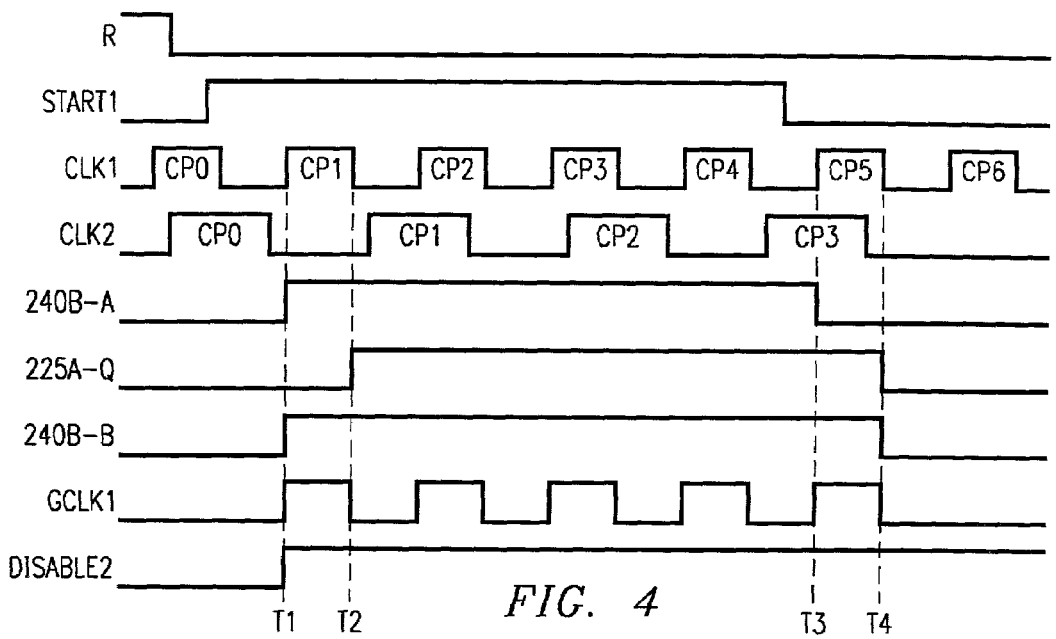
FIG. 4 is a timing diagram illustrating the operation of the clock selection circuit according to the exemplary embodiment of the present invention.

FIG. 4 is a timing diagram illustrating the operation of selected portions of clock selection circuit 115 according to an exemplary embodiment of the present invention. Initially, the reset (R) signal is Logic 1 (i.e., high). The reset (R) signal is an active high master reset that sets the Q outputs of all of flip-flops 215A and 215B, flip-flops 225A and 225B, and flip-flops 310, 320 and 330 to Logic 0 (i.e., low). When the Q outputs of these flip-flops are Logic 0, the A and B inputs to interlock circuits 240A and 240B are Logic 0 and the DISABLE1 and DISABLE2 outputs of interlock circuits 240A and 240B are also Logic 0. Also, when the Q outputs of these flip-flops are all Logic 0, OR gates 230A and 230B output Logic 0 values to AND gates 235A and 235B. This, in turn, sets the gated clock signals GCLK1 and GCLK2 to Logic 0 and CLKOUT also is held at Logic 0.

This state continues after the reset (R) signal is set back to Logic 0 until either START1 or START2 is set to Logic 1. Since clock control circuits 201A and 201B operate in similar manners, the following text describes in detail the operation of clock control circuit 201A. The corresponding description of clock control circuit 201B is omitted to avoid redundancy.

The clock pulses (CPs) of CLK1 and CLK2 are sequentially numbered (i.e., CP1, CP2, CP3, . . . ). Since DISABLE1 is initially Logic 0, when the START1 signal finally goes to Logic 1 prior to the rising edge of CP1, both inputs of AND gate 210A are finally Logic 1, which sets the D input of flip-flop 215A to Logic 1. On the rising edge of CP1 (i.e., time T1), the Q output of flip-flop 215A goes to Logic 1. This sets the A input of interlock circuit 240B (shown as 240B-A in FIG. 4) to Logic 1. On the falling edge of CP1 (i.e., time T2), the Q output of flip-flop 225A (shown as 225A-Q in FIG. 4) goes to Logic 1.

When the START1 signal finally goes to Logic 0 prior to the rising edge of CP5, one of the inputs to AND gate 210A goes to Logic 0, which sets the D input of flip-flop 215A to Logic 0. On the rising edge of CP5 (i.e., time T3), the Q output of flip-flop 215A goes to Logic 0. This sets the A input of interlock circuit 240B (shown as 240B-A in FIG. 4) to Logic 0. On the falling edge of CP5 (i.e., time T4), the Q output of flip-flop 225A (shown as 225A-Q in FIG. 4) goes to Logic 0.

When the A input of interlock circuit 240B goes to Logic 1 at time T1, the DISABLE2 signal immediately goes to Logic 1. This immediately disables the START2 input of clock control circuit 201B, preventing the GCLK2 clock from being exerted for as long as START1 remains at Logic 1. The B input of interlock circuit 240B (shown as 240B-B in FIG. 4) is the logic OR of the Q output of flip-flop 215A and the Q output of flip-flop 225A. If either the Q output of flip-flop 215A or the Q output of flip-flop 225A is Logic 1, then B input of interlock circuit 240B is also Logic 1. The rising edges of CP1, CP2 and CP3 propagate the Logic 1 at the B input of interlock circuit 240B to hold the DISABLE2 signal at Logic 1.

When the Logic 1 on the A input of interlock circuit 240B finally goes to Logic 0 at time T3 (as a result of START1 going to Logic 0 prior to CP5), the DISABLE2 signal output is unaffected because the other input to OR gate 340 is held at Logic 1 by the Q output of flip-flop 330. After the B input of interlock circuit 240B goes to Logic 0 at time T4, it takes another three rising edges of the CLK2 clock to propagate the Logic 0 from the B input of interlock circuit 240B to the Q output of flip-flop 330. Only then does the DISABLE2 signal go to Logic 0, thereby enabling the START2 signal via AND gate 210B. Thus, the DISABLE2 signal is a fast turn-on, slow turn-off signal with respect to the START1 signal. Similarly, the DISABLE1 signal is a fast turn-on, slow turn-off signal with respect to the START2 signal.

As noted above, the B input of interlock circuit 240B (shown as 240B-B in FIG. 4), taken from the output of OR gate 230A, is the logic OR of the Q output of flip-flop 215A and the Q output of flip-flop 225A. The output of OR gate 230A also enables AND gate 235A to pass the CLK1 signal to the output of AND gate 235A. Thus, if either the Q output of flip-flop 215A or the Q output of flip-flop 225A is Logic 1, then CLK1 appears at GCLK1, the gated clock output of clock control circuit 201A. Since the Q output of flip-flop 225A only goes to Logic 0 on the falling edges of CLK1 clock pulses, the GCLK1 signal only goes low on the falling edges of CLK1 clock pulses. Thus, clock pulses at GLK1 are not cut short when START1 goes to Logic 0.

As noted above, the operation of clock control circuit 201B is substantially identical to the operation of clock control circuit 201A. Thus, it is unnecessary and redundant to explain in detail the operation of clock control circuit 201B.

Although the present invention has been described in detail, those skilled in the art should understand that they can make various changes, substitutions and alterations herein without departing from the spirit and scope of the invention in its broadest form.

What is claimed is:

1. For use with a clocked circuit, a clock selection circuit capable of receiving a first input clock signal and a second input clock signal and outputting to said clocked circuit a selected clock signal derived from one of said first and second input clock signals, said clock selection circuit comprising:

a first clock control circuit that receives said first input clock signal and a first start signal, wherein said first start signal, when asserted, is capable of causing said first clock control circuit to output a first gated clock signal;

a second clock control circuit that receives said second input clock signal and a second start signal, wherein said second start signal, when asserted, is capable of causing said second clock control circuit to output a second gated clock signal;

a first interlock circuit that detects when said first clock control circuit begins outputting said first gated clock signal and, in response to said detection, that asserts a first disable signal capable of preventing said second clock control circuit from outputting said second gated clock signal;

a second interlock circuit that detects when said second clock control circuit begins outputting said second gated clock signal and, in response to said detection, that asserts a second disable signal capable of preventing said first clock control circuit from outputting said first gated clock signal; and a first OR gate that receives said first and second gate clock signal and outputs said selected clock signal;

wherein the first clock control circuit comprises a first flip-flop, a second flip-flop coupled in series with the first flip-flop, and a second OR gate having a first input coupled to an output of the first flip-flop and a second input coupled to an output of the second flip-flop.

2. The clock selection circuit as set forth in claim 1 wherein said first interlock circuit detects when said first clock control circuit stops outputting said first gated clock signal and, in response to said detection, de-asserts said first disable signal after a first delay period suitable to allow a clock pulse propagating through said first clock control circuit to be completely output at said selected clock signal.

3. The clock selection circuit as set forth in claim 2 wherein:

the first and second flip-flops and the second OR gate in the first clock control circuit form a first clock enable circuit that receives said second disable signal and said first start signal and outputs a first clock enable signal when said first start signal is asserted and said second disable signal is not asserted; and the first clock control circuit further comprises a first AND gate having a first input coupled to said first clock enable signal and a second input coupled to said first input clock signal, wherein said first AND gate outputs said first gated clock signal.

4. The clock selection circuit as set forth in claim 3 wherein said first clock enable circuit further comprises a first input logic circuit having an output that outputs a Logic 1 when said first start signal is asserted and said second disable signal is not asserted.

5. The clock selection circuit as set forth in claim 4 wherein the first flop-flop has an input coupled to said output of said first input logic circuit, wherein said first flip-flop is clocked by a rising edge of said first input clock signal and said first interlock circuit monitors the output of said first flip-flop to detect when said first clock control circuit begins outputting said first gated clock signal.

6. The clock selection circuit as set forth in claim 5 wherein:

the second flip-flop has an input coupled to said output of said first flip flop, wherein said second flip-flop is clocked by a falling edge of said first input clock signal; and an output of said second OR gate comprises said first clock enable signal.

7. The clock selection circuit as set forth in claim 6 wherein said second interlock circuit detects when said second clock control circuit stops outputting said second gated clock signal and, in response to said detection, de-asserts said second disable signal after a delay period suitable to allow a clock pulse propagating through said second clock control circuit to be completely output at said selected clock signal.

8. The clock selection circuit as set forth in claim 7 wherein said second clock control circuit comprises:

a second clock enable circuit that receives said first disable signal and said second start signal and outputs a second clock enable signal when said second start signal is asserted and said first disable signal is not asserted; and a second AND gate having a first input coupled to said second clock enable signal and a second input coupled to said second input clock signal, wherein said second AND gate outputs said second gated clock signal.

9. The clock selection circuit as set forth in claim 8 wherein said second clock enable circuit comprises a second input logic circuit having an output that outputs a Logic 1 when said second start signal is asserted and said first disable signal is not asserted.

10. The clock selection circuit as set forth in claim 9 wherein said second clock enable circuit further comprises:

a third flip-flop having an input coupled to said output of said second input logic circuit, wherein said third flip-flop is clocked by a rising edge of said second input clock signal and said second interlock circuit monitors an output of said third flip-flop to detect when said second clock control circuit begins outputting said second gated clock signal;

a fourth flip-flop having an input coupled to said output of third flip-flop, wherein said fourth flip-flop is clocked by a falling edge of said second input clock signal; and a third OR gate having a first input coupled to said output of said third flip-flop and a second input coupled to an output of said fourth flip-flop, wherein an output of said third OR gate comprises said second clock enable signal.

11. A processing system comprising:

a clocked circuit capable of operating at a plurality of clock frequencies;

a first clock signal source;

a second clock signal source; and a clock selection circuit capable of receiving a first input clock signal from said first clock signal source and a second input clock signal from said second clock signal source and outputting to said clocked circuit a selected clock signal derived from one of said first and second input clock signals, said clock selection circuit comprising:

a first clock control circuit that receives said first input clock signal and a first start signal, wherein said first start signal, when asserted, is capable of causing said first clock control circuit to output a first gated clock signal;

a second clock control circuit that receives said second input clock signal and a second start signal, wherein said second start signal, when asserted, is capable of causing said second clock control circuit to output a second gated clock signal;

a first interlock circuit that detects when said first clock control circuit begins outputting said first gated clock signal and, in response to said detection, that asserts a first disable signal capable of preventing said second clock control circuit from outputting said second gated clock signal;

a second interlock circuit that detects when said second clock control circuit begins outputting said second gated clock signal and, in response to said detection, that asserts a second disable signal capable of preventing said first clock control circuit from outputting said first gated clock signal; and a first OR gate that receives said first and second gate clock signal and outputs said selected clock signal;

wherein the first clock control circuit comprises a first flip-flop, a second flip-flop coupled in series with the first flip-flop, and a second OR gate having a first input coupled to an output of the first flip-flop and a second input coupled to an output of the second flip-flop.

12. The processing system as set forth in claim 11 wherein said first interlock circuit detects when said first clock control circuit stops outputting said first gated clock signal and, in response to said detection, de-asserts said first disable signal after a first delay period suitable to allow a clock pulse propagating through said first clock control circuit to be completely output at said selected clock signal.

13. The processing system as set forth in claim 12 wherein:

the first and second flip-flops and the second OR gate in the first clock control circuit form a first clock enable circuit that receives said second disable signal and said first start signal and outputs a first clock enable signal when said first start signal is asserted and said second disable signal is not asserted; and the first clock control circuit further comprises a first AND gate having a first input coupled to said first clock enable signal and a second input coupled to said first input clock signal, wherein said first AND gate outputs said first gated clock signal.

14. The processing system as set forth in claim 13 wherein said first clock enable circuit further comprises a first input logic circuit having an output that outputs a Logic 1 when said first start signal is asserted and said second disable signal is not asserted.

15. The processing system as set forth in claim 14 wherein the first flop-flop has an input coupled to said output of said first input logic circuit, wherein said first flip-flop is clocked by a rising edge of said first input clock signal and said first interlock circuit monitors the output of said first flip-flop to detect when said first clock control circuit begins outputting said first gated clock signal.

16. The processing system as set forth in claim 15 wherein:
the second flip-flop in the first clock enable circuit has an input coupled to said output of said first flip flop, wherein said second flip-flop is clocked by a falling edge of said first input clock signal; and
an output of said second OR gate comprises said first clock enable signal.

17. The processing system as set forth in claim 16 wherein said second interlock circuit detects when said second clock control circuit stops outputting said second gated clock signal and, in response to said detection, de-asserts said second disable signal after a delay period suitable to allow a clock pulse propagating through said second clock control circuit to be completely output at said selected clock signal.

18. The processing system as set forth in claim 17 wherein said second clock control circuit comprises:
a second clock enable circuit that receives said first disable signal and said second start signal and outputs a second clock enable signal when said second start signal is asserted and said first disable signal is not asserted; and
a second AND gate having a first input coupled to said second clock enable signal and a second input coupled to said second input clock signal, wherein said second AND gate outputs said second gated clock signal.

19. The processing system as set forth in claim 18 wherein said second clock enable circuit comprises a second input logic circuit having an output that outputs a Logic 1 when said second start signal is asserted and said first disable signal is not asserted.

20. The processing system as set forth in claim 19 wherein said second clock enable circuit further comprises:
a third flip-flop having an input coupled to said output of said second input logic circuit, wherein said third flip-flop is clocked by a rising edge of said second input clock signal and said second interlock circuit monitors an output of said third flip-flop to detect when said second clock control circuit begins outputting said second gated clock signal;
a fourth flip-flop having an input coupled to said output of third flip-flop, wherein said fourth flip-flop is clocked by a falling edge of said second input clock signal; and
a third OR gate having a first input coupled to said output of said third flip-flop and a second input coupled to an output of said fourth flip-flop, wherein an output of said third OR gate comprises said second clock enable signal.

* * * * *